United States Patent
Miller et al.

(10) Patent No.: US 8,264,482 B2
(45) Date of Patent: Sep. 11, 2012

(54) INTERLEAVING DRIVE CIRCUIT AND ELECTRO-LUMINESCENT DISPLAY SYSTEM UTILIZING A MULTIPLEXER

(75) Inventors: Michael E. Miller, Honeoye Falls, NY (US); Christopher J. White, Avon, NY (US)

(73) Assignee: Global OLED Technology LLC, Herndon, VA (US)

( * ) Notice: Subject to any disclaimer, the term of this patent is extended or adjusted under 35 U.S.C. 154(b) by 988 days.

(21) Appl. No.: 11/959,755

(22) Filed: Dec. 19, 2007

(65) Prior Publication Data

US 2009/0160826 A1   Jun. 25, 2009

(51) Int. Cl.
*G06F 3/038* (2006.01)
*G09G 3/30* (2006.01)
*G09G 3/10* (2006.01)

(52) U.S. Cl. .......... 345/213; 345/76; 345/77; 315/169.3

(58) Field of Classification Search ............ 345/76–104, 345/204–215, 690–699; 348/800–803; 428/690; 313/498–512; 315/169.3
See application file for complete search history.

(56) References Cited

U.S. PATENT DOCUMENTS

| | | |
|---|---|---|
| 4,281,341 A | 7/1981 | Byatt |
| 5,686,975 A | 11/1997 | Lipton |
| 5,844,717 A | 12/1998 | Faris |
| 5,945,972 A * | 8/1999 | Okumura et al. ............... 345/98 |
| 6,020,941 A | 2/2000 | Ma |
| 6,359,664 B1 | 3/2002 | Faris |
| 6,958,741 B2 * | 10/2005 | Tsutsui .......................... 345/90 |
| 7,066,599 B2 | 6/2006 | Hattori et al. |
| 7,068,252 B2 | 6/2006 | Hattori et al. |
| 7,221,332 B2 | 5/2007 | Miller et al. |
| 7,227,568 B2 | 6/2007 | Sun et al. |
| 2006/0028407 A1 * | 2/2006 | Chou ............................ 345/76 |
| 2006/0033745 A1 * | 2/2006 | Koselj et al. .................. 345/519 |
| 2006/0164345 A1 * | 7/2006 | Sarma et al. ................... 345/76 |
| 2006/0208973 A1 * | 9/2006 | Lee et al. ........................ 345/76 |
| 2008/0055299 A1 * | 3/2008 | Choi et al. .................... 345/211 |
| 2008/0284693 A1 * | 11/2008 | Sarma et al. ................... 345/77 |
| 2009/0002586 A1 * | 1/2009 | Kimura ........................... 349/39 |
| 2010/0245212 A1 * | 9/2010 | Dallas et al. .................... 345/32 |

FOREIGN PATENT DOCUMENTS

WO     2006/020511     2/2006

OTHER PUBLICATIONS

"Efficiency analysis for multi-view spatially multiplexed autostereoscipc 2-D/3-D displays," by Woodgate and Harrold, Journal of the Society for Information Display, pp. 873-881, 2007.

* cited by examiner

*Primary Examiner* — Bipin Shalwala
*Assistant Examiner* — Keith Crawley
(74) *Attorney, Agent, or Firm* — Morgan, Lewis & Bockius LLP

(57) ABSTRACT

A drive circuit for rapidly interleaving image data displayed on an EL device is disclosed. The drive circuit includes a signal source that provides a image data signals. Each image data signal is provided for a specified load period. A multiplexer receives the image data signals, and in response to a selection signal selects one of the image data signals to provide a control signal that directs the EL device to emit light. Additionally, a controller causes interleaving of the image data during multiple display periods; each display period is shorter than the load period.

18 Claims, 12 Drawing Sheets

INTERLEAVING DRIVE CIRCUIT AND ELECTRO-LUMINESCENT DISPLAY SYSTEM UTILIZING A MULTIPLEXER

FIELD OF THE INVENTION

The present invention relates to a drive circuit and electro-luminescent display system. Particularly, the present invention includes a circuit and an electro-luminescent display for providing synchronous display of multiple signal values with a reduced update rate.

BACKGROUND OF THE INVENTION

Many display devices exist within the market today. Among the displays that are available are thin-film, coated, electro-luminescent displays, such as OLED displays. These displays may be driven using active matrix backplanes, which employ an active circuit.

Stereoscopic displays are also known in the art. These displays may be formed using a number of techniques. Among the most commercially successful stereoscopic displays to date have been displays either employing some method of shuttering light, such that the light from one frame of data is able to enter only the left or right eye at any point in time and left and right eye images are shown in rapid succession. Two primary methods have been employed in this domain; including displays that employ active shutter glasses or passive polarizing glasses. For example, Byatt in U.S. Pat. No. 4,281,341, entitled, "Stereoscopic Television System" described a system employing a switchable polarizer that is placed in front of a CRT and is viewed with glasses; wherein each lens of the glasses transmits light having one of the two polarization states that are passed by the switchable polarizer. In such a system the polarization is switched to select which eye will see the display at any instant in time; and by synchronizing the display of images with the switching of the polarizer, the system can display a different image to each eye of the observer. Temporal updates of stereoscopic information using techniques such as these enables a user to see the full resolution of the display and enables switching from a monoscopic to a stereoscopic viewing mode. Unfortunately, the disadvantage of such a system is that the update rate of the display and the switching element must be quite high to avoid the perception of flicker. Therefore, required refresh rates of at least 60 Hz per image are provided to each eye; and even higher refresh rates are desired.

Unfortunately, refresh rates significantly higher than 60 Hz can be difficult to attain in large active matrix thin-film electro-luminescent displays, such as OLED displays. In these displays, the active circuitry is separated from a sheet electrode, often the cathode, by only 100 to 200 nm of material having a dielectric constant often in the neighborhood of 3. As such, a significant capacitance can exist between the active matrix drive electronics, particularly data lines within the active matrix circuitry and other elements within the display, particularly the sheet electrode within the display. This capacitance can create a significant RC constant and limit the update rate at which data may be clocked into pixel circuits to rates below 120 Hz, particularly in larger displays where the resistance of the data lines can be significant.

Another issue with using conventional shutter glasses or full screen switching polarizers is discussed by Chang in U.S. patent application Ser. Nos. 11/200,270 and 11/200,774, each entitled "Method and apparatus for stereoscopic display employing an array of pixels each employing an organic light emitting diode". As discussed, these displays are often updated one line at a time and provide light for the entire time between updates. As such, Chang describes a stereoscopic organic light-emitting diode display in which a first eye's image is blanked before the second eye's image is displayed. In a stereoscopic display in which the entire image is updated by a stereoscopic overlay, this blanking interval reduces the crosstalk between the left and right image. In a particular implementation, depicted in FIG. 5a of their disclosure and reproduced in FIG. 1 of this disclosure, a circuit is provided that allows a left eye image to be written into a portion of the circuit 2 and then displayed while the right eye image is written into a separate portion of the same circuit 4. That is, the TFT 10 can control power to the OLED 8 such that if each of these transistors in each circuit in the entire display are controlled simultaneously, every OLED in the entire display may be activated or deactivated simultaneously. As such, an entire image for one eye may be written into each circuit in the display while a second portion of the same circuit is used to display the image to the other eye, allowing the on time for each pixel in the display to be synchronized with the optical switch. As such, cross talk is reduced. Notice, however, that this circuit controls the current from the power supply Vdd 6 through two of the TFTs (e.g., 12a, 12b) in each portion 2, 4 of the circuit to the OLED 8. Since these TFTs 12a, 12b must provide current to illuminate the OLED; they will typically be required to be large TFTs to support this current load. Further, this prior art circuit has a large number of additional transistors and connecting wires, which complicate the circuit; uses large amounts of backplane real estate (limiting display resolution); and will require very high yield rates to allow successful manufacturing of a working active circuit. Therefore, this particular prior art circuit is relatively large and can be expensive to implement. Further, the circuit does not provide a method for reducing flicker as the image update, delayed by the display, is restricted to the same update rate.

Circular polarization has also been used in systems to provide images without flicker or with the cross-talk that occurs as the update of the information and the optical switch are not synchronized for each pixel in the display by using an approach that is similar to that employed in barrier screen displays. Lipton in U.S. Pat. No. 5,686,975, entitled, "Polarel Panel for Stereoscopic Displays" and Ma in U.S. Pat. No. 6,020,941, entitled, "Stereographic liquid crystal display employing switchable liquid crystal materials of two polarities in separate channels" each describe display systems where alternating columns of a display device are each provided with circular polarizers that are arranged in columns, such that alternating columns provide light that is circularly polarized with left and right handed orientation. By changing the handedness of the polarization in this way, and by wearing polarized glasses, each eye is provided alternating columns of the information from the display. However, as the handedness of the polarization of the light is kept constant during display of stereoscopic imagery, the resolution is reduced due to the fact that each eye can only see half of the columns of the display while viewing stereoscopic imagery. Faris in U.S. Pat. No. 5,844,717, entitled, "Method and system for producing micropolarization panels for use in micropolarizing spatially multiplexed images of 3-D objects during stereoscopic display processes" and Faris in U.S. Pat. No. 6,359,664, entitled, "Electro-optical display system for visually displaying polarized spatially multiplexed images of 3-D objects for use in stereoscopically viewing the same with high image quality and resolution" have described similar displays that provide stereoscopic images by arranging a two-dimensional array of micropolarizers on a display surface with each eye being able to see a checkerboard pattern of the image. However, because each of these embodiments employ static methods of controlling the light seen by each of the user' eyes the perceived resolution of the display is reduced by a factor of at least two.

Lenses may be formed over the display to provide stereoscopic information as described by Tutt et al. in US patent application Number US200739859, entitled, "3D or multiview light emitting display" or dynamic lenses as described by Woodgate and Harrold in the Society for Information Display Journal article entitled, "Efficiency analysis for multi-view spatially multiplexed autostereoscopic 2-D/3-D displays" may be used to provide multiple views of a display to multiple locations in space. However, when the display is not updated temporally, the effective resolution of the display is reduced; and when it is updated temporally, high update rates are required.

Hattori et al. in U.S. Pat. No. 7,068,252, entitled, "Display unit capable of displaying two- and three-dimensional images and method for controlling display unit" and in U.S. Pat. No. 7,066,599, entitled, "Display unit" discuss the formation of a barrier screen for limiting the path of light to one of two angles corresponding to different points of view. This screen is switchable, such that the direction of the light is changed between refreshes of the stereoscopic overlay, allowing the light from one pixel or region of a display to be transmitted to one eye within one time interval; and the light from the same pixel or region of the display to be transmitted to the other eye within a subsequent time interval. One could apply such a barrier screen with an OLED display. Unfortunately, the EL display would require a high refresh rate; and because the barrier screen is switched for an entire column, such a barrier would generally not be synchronized with pixel updates within an active matrix EL display.

Sun and Lao in U.S. patent application Ser. No. 11/092,889, entitled, "Dual polarizing light filter for 2-D and 3-D display" discuss a display overlay capable of switching between two polarization states on a pixel-by-pixel basis. By using such an overlay, two different polarization states may be imparted to the light passing through any pixel in the overlay, within any time interval. Miller et al in U.S. Pat. No. 7,221,332, entitled, "3D stereo OLED display" describe the use of a similar display structure with an OLED display in which the switching of the polarization states is synchronized with the update of information on the OLED display. While this latter patent recognizes that the update rate may be limited, it does not provide methods for increasing the effective refresh rate of the display.

Each of the prior art discussions of EL display implementation have involved methods for modulating the output of the EL light-emitting diodes within the display by modulating an analog signal, which modulates the current through the EL device. However, in addition to these analog drive methods, it is also known to drive EL displays with digital drive methods as discussed by Kawabe in International Publication Number WO 2006/020511, entitled, "Emissive display device driven in subfield mode and having precharge circuit". As described in this publication, each EL light-emitting diode may be provided with either no current or a single fixed current and the light output by the light-emitting diode may be modulated by changing the duration of this light output. In such embodiments, each frame time is divided into a number of subfields, requiring that the signal to each light-emitting diode be switched multiple times during each frame. However, the refresh rate (i.e., the number of frames provided each second) is limited by the capacitance and resistance of the display structure as it is limited for the analog drive methods and has the additional constraint that data for multiple subfields must be provided within each frame.

A method is needed, therefore, for increasing the effective update rate of an EL display to allow flicker-free presentation of stereoscopic, 3D or other information. Such a method should also be effective in reducing cross-talk between left and right eye images in EL displays.

SUMMARY OF THE INVENTION

The aforementioned need is met by providing a drive circuit for rapidly interleaving image data displayed on an EL device. The drive circuit includes a signal source that provides image data signals. Each image data signal is provided for a specified load period. A multiplexer receives the image data signals and, in response to a selection signal, selects one of the image data signals as a control signal to direct the EL device to emit light. Additionally, a controller causes interleaving of the image data during multiple display periods; each display period is shorter than the load period.

Another aspect of the present invention provides an EL display system that includes an array of EL devices; each EL device emitting light in response to a control signal. An array of drive circuits provide control signals; each drive circuit having a multiplexer for receiving image data signals, and in response to a selection signal, selects one of the image data signals as the control signal. A signal source provides image data signals; each image data signal is provided for a specified load period. A controller causes interleaving of the image data during multiple display periods; each display period is shorter than the load period.

DETAILED DESCRIPTION OF THE INVENTION

Figure 1:
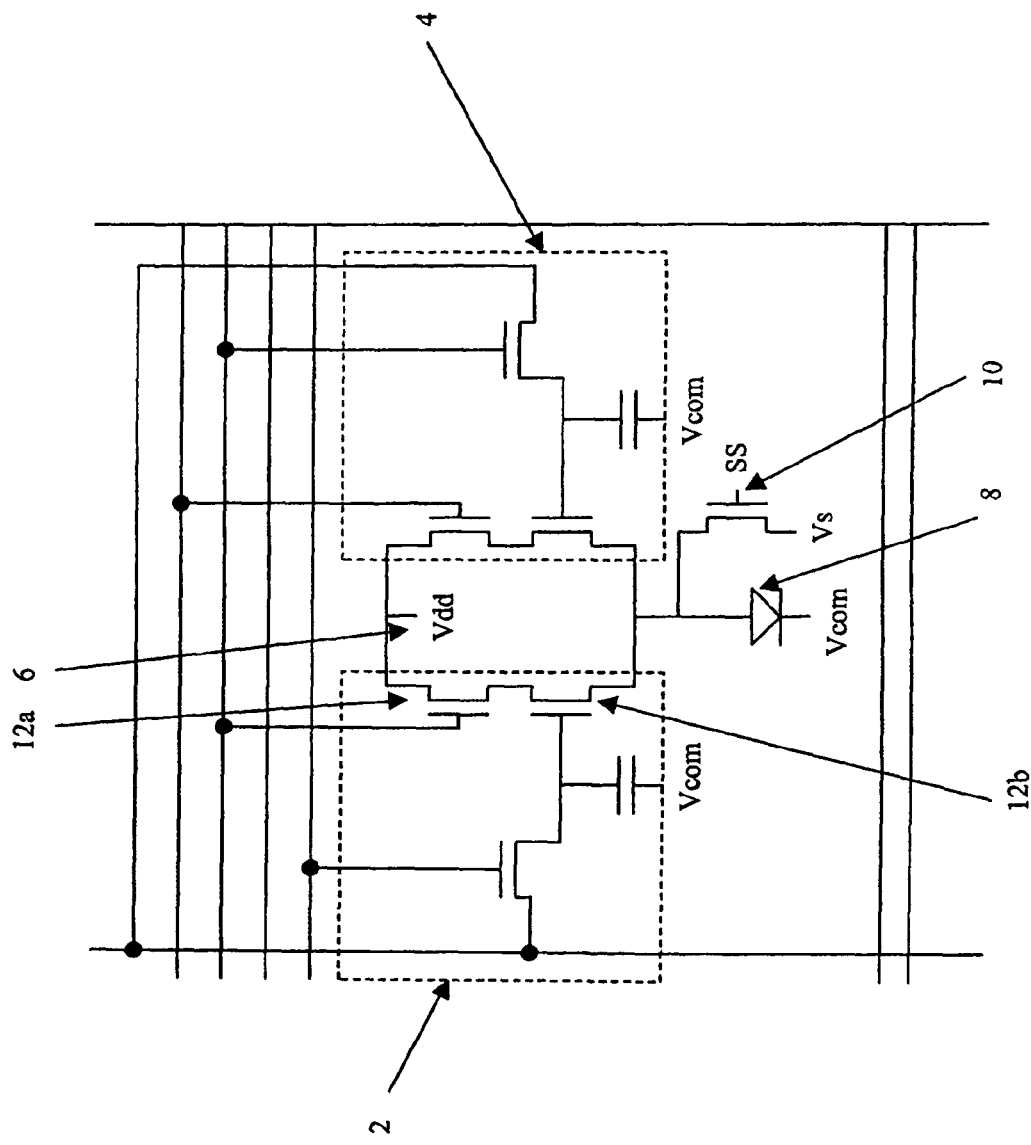
FIG. 1 is a prior art drive circuit for a stereoscopic display.
Figure 2:
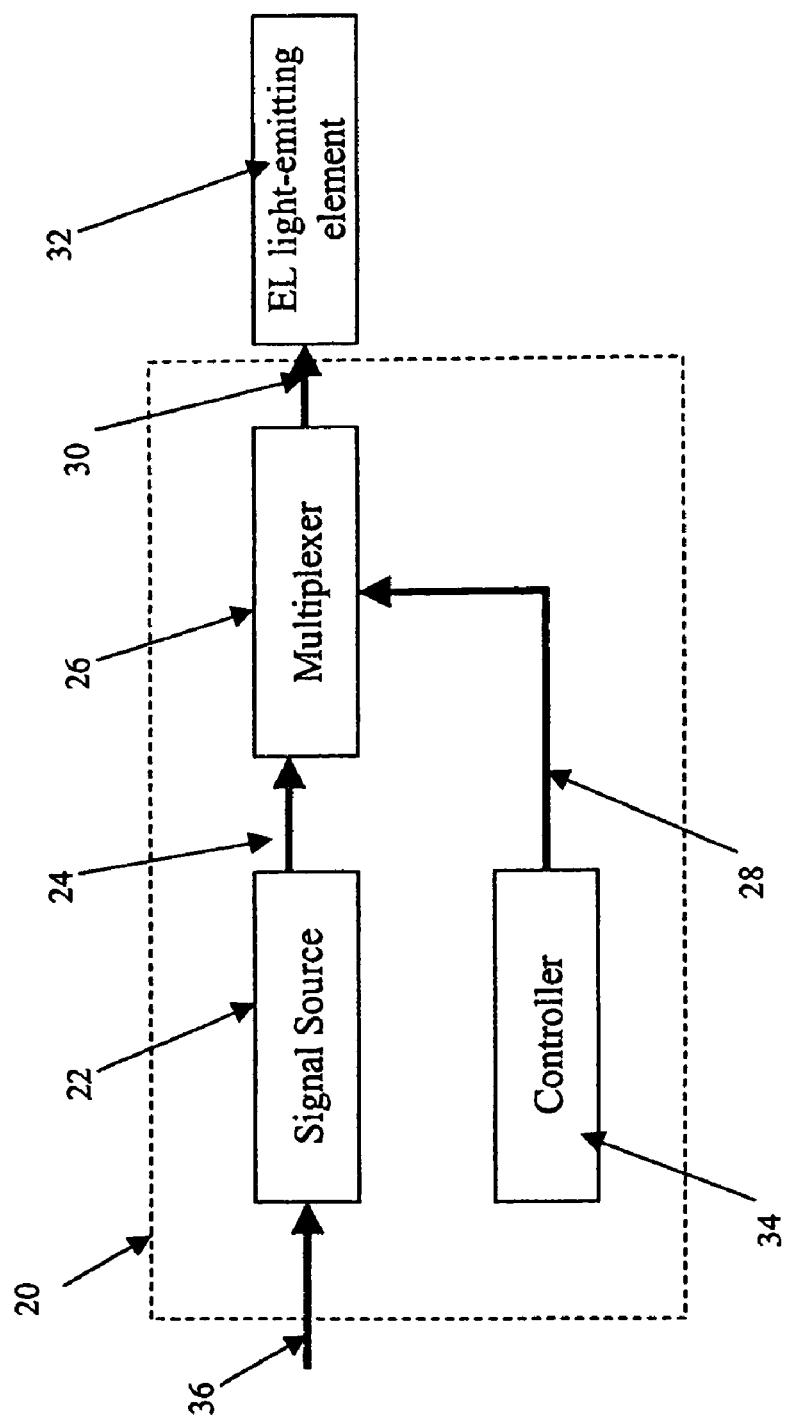
FIG. 2 is a block diagram of the components of a drive circuit useful in one embodiment of the present invention.

The aforementioned need is met by providing a drive circuit for rapidly interleaving image data displayed on an EL device as shown in FIG. 2. As shown, the drive circuit 20 is comprised of a signal source 22 that provides a plurality of image data signals 24, each image data signal being provided for a specified load period; a multiplexer 26 for receiving the plurality of image data signals 24, and in response to a selection signal 28, selecting one of the image data signals as a control signal 30 that directs the EL device to emit light 32; and a controller 34 causing interleaving of the image data signals 24 during multiple display periods by providing the selection signal 28 to the multiplexor 26; wherein each display period is shorter than the load period. As shown, the drive circuit provides a succession of values of the selection signal 28 to the multiplexer 26. Each selection signal 28 value will typically be provided for one display period. Typically, this drive circuit will receive an RGB input signal 36 from which the signal source 22 will form the image data signals 24 and the image data signals will be provided in a temporal sequence. This drive circuit provides an image having a higher physical or perceived refresh rate, due to the interleaving of image data thereby providing a display period that is shorter than the load period. Therefore, the data may be displayed at a higher rate than it is loaded, overcoming the constraints produced by having a high RC constant when loading data into the drive circuit. As will be discussed further within some detailed embodiments, this drive circuit can be particularly advantaged in displays that provide multiple sets of information simultaneously. For example, this drive circuit can be particularly advantageous when constructing stereoscopic or multiview 3D displays.

Figure 3:
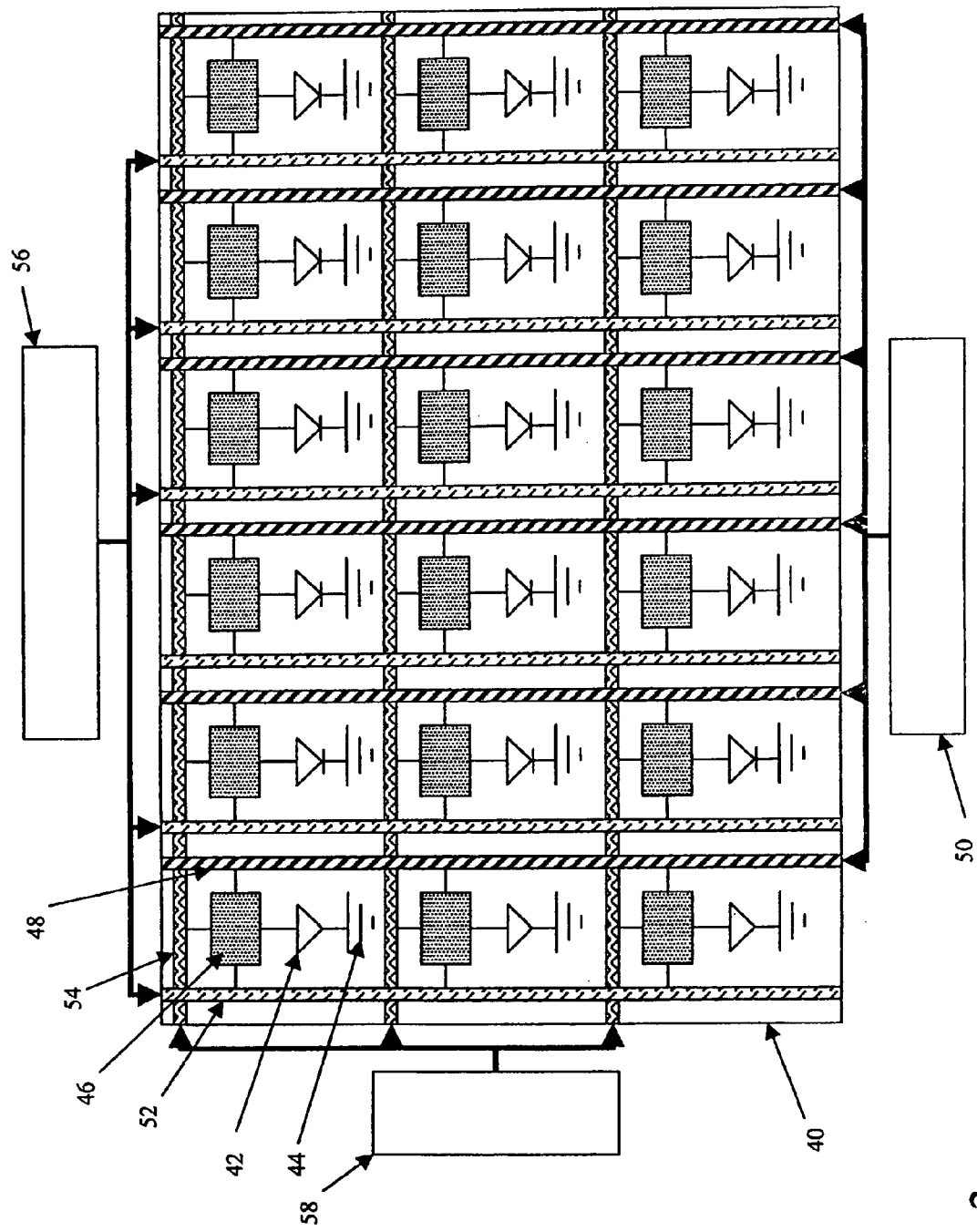
FIG. 3 is a block diagram of an EL display system useful in employing a drive circuit of the present invention.

Components of this drive circuit can be embedded into an EL display system, such as the EL display system shown in FIG. 3. As shown, the exemplary EL display system includes a substrate 40 on which are formed an array of one or more EL light-emitting diodes 42, each diode corresponding to the EL light-emitting element 32 of FIG. 2. Each of the EL light-emitting diodes 42 will typically be connected to a ground 44, which may be formed from a common sheet of a conductive material (not shown) attached to a power supply (also not shown). Additionally, each of the light emitting diodes 42 can be connected to an active-matrix circuit 46. This active-matrix circuit 46 controls the flow of current from a power line 48, which is attached to a power supply 50. This active-matrix circuit 46 is also connected to a data line 52, which provides a signal to the active-matrix circuit 46 to control the flow of current from the power line 48 to the EL light-emitting diode 42. At least one select line 54 is typically formed to select a row of active matrix circuits 46. Signals are provided to the data lines 52 from the column driver 56 and are provided to the select lines 54 from row drivers 58. Typically, both the data lines 52 and the select lines 54 have a finite resistance. Further, capacitance is formed between each of these lines and the orthogonal lines on the substrate 40. Additional capacitance is formed between each of these lines and the common sheet of conductive material (not shown). This capacitance is particularly high in thin film EL light-emitting devices as these devices are often less than a few thousand angstroms in thickness. The dielectric constant of the materials that form the EL light-emitting diode often provide separation between the common sheet of conductive material and the data 52 and select 54 lines. The capacitance and resistance of each of these lines together form a low pass filter, which limits the rate at which signals can be provided on the data 52 and select 54 lines.

Particular embodiments employing an analog drive method can comprise a data line 52 for transmitting the image data signals 24 from the signal source embedded within the column driver 56 to an array of active-matrix circuits 46 and a metal electrode (not shown) for providing power from a power supply to the one or more EL light-emitting diodes 42. Data line 52 has a resistance and a capacitance that is formed between the data line 52 and other components within the display, including the metal electrode. This resistance and capacitance provides an RC constant that limits the frequency drive signal to a value that precludes the switching of image data signals 24 at a rate that allows the load period to be as short as the display period. In such embodiments, the signal source 22 can be provided within the column driver 56, the drive signal 24 will be presented on the drive lines 52 to an active-matrix circuit 46, which will serve as the multiplexer 26. This multiplexer 26 will provide a control signal 30 to the EL light-emitting element 32. The multiplexer 26, in this example the active-matrix circuit 46, will additionally respond to a selection signal 28 from a controller 34 to select one of the drive signals. When using an analog drive method, controller 34 provides a signal within row driver 58, and the selection signal 28 will be provided on one or a combination of multiple select lines 54.

Figure 4:
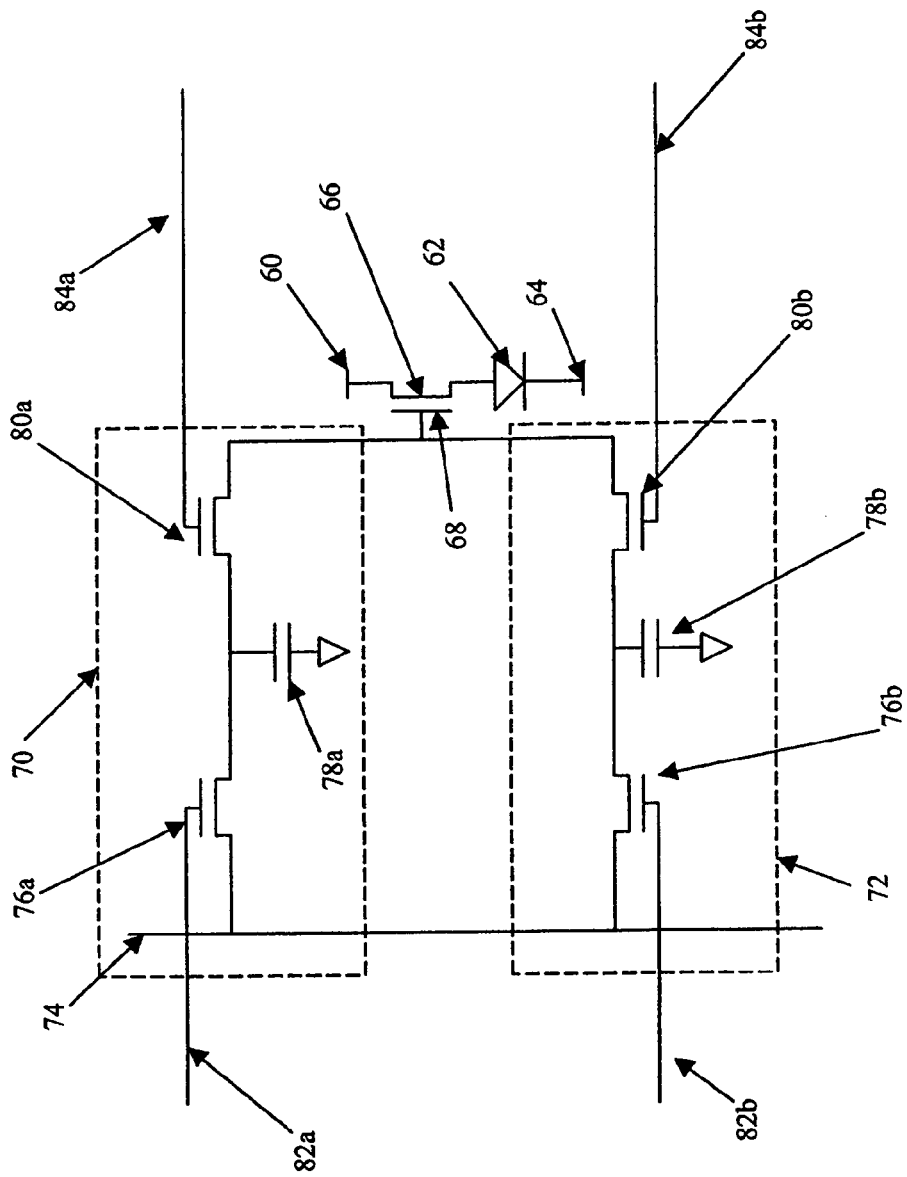
FIG. 4 is an active matrix circuit useful in one analog embodiment of the present invention.

An active-matrix circuit 46, useful in embodiments such as shown in FIG. 3, is shown in FIG. 4. As shown in this figure, this active-matrix circuit controls the flow of current from a power line 60 to an EL light-emitting diode 62 and to ground 64. Within the active-matrix circuit, the drive thin film transistor (TFT) 66 controls the flow of current through the EL light-emitting diode 62, based upon the voltage provided at the gate 68 of this drive TFT 66. Within this active-matrix circuit, the voltage to the gate 68 of the drive TFT 66 is provided by the drive line 74 to either current control circuit 70 or current control circuit 72; and either current control circuit 70 or current control circuit 72 provides a voltage to the drive TFT 66. Each of the current control circuits 70, 72 are comprised of a write transistor 76a, 76b; a storage element, specifically storage capacitors 78a, 78b, and a read transistor 80a, 80b. As such, the multiplexer 26 comprises a drive transistor 66 connected to a first power supply 60 and a plurality of current control circuits 70, 72. Each current control circuit 70, 72 is connected to a gate electrode 68 of the drive transistor 68 and also comprises a write transistor 76a, 76b, a storage element 78a, 78b and a read transistor 80a, 80b, wherein each current control circuit 70, 72 provides a corresponding value of the control signal.

During operation, a select signal is presented on one of the write lines 82a, 82b, placing a voltage on the gate of one of the write transistors 76a or 76b. This voltage activates the selected write transistor 76a or 76b, making the selected write transistor conducting. A drive signal is provided on the drive line 74 and passes through the selected write transistor 76a or 76b and charges the storage capacitor 78a or 78b that is connected to the selected write transistor 76a or 76b. The signal is then removed from the write line 82a or 82b and also subsequently from the drive line 74. A signal is placed on the alternate of the write lines 82a or 82b, activating the second of the write transistors 76a or 76b. A drive signal is placed on the drive line 74 to charge the alternate of the storage capacitors 78a or 78b. Once again the signal is removed from the write line 82a, 82b and then from the write line. This process is repeated, providing both subsequent drive signals to the current control circuits 70, 72. Simultaneously, a select signal is alternately placed onto the read lines 84a or 84b, allowing a voltage stored on the capacitors 78a, 78b to pass through the circuit and be presented on gate 68 of the power TFT 66 to control the flow of current from the power line 60 to the EL light-emitting diode 64. It can be advantageous for the capacitance of capacitors 78a, 78b to be much greater than the parasitic capacitance at the gate of the power TFT 66 in order to reduce crosstalk between capacitors 78a, 78b.

In the active-matrix circuit of FIG. 4, the read transistors 80a, 80b are switched at a rate that is higher than the rate at which the write transistors 78a, 78b are switched, allowing the write transistors 78a, 78b to be active for longer periods of time than the read transistors 80a, 80b. Therefore this active-matrix circuit serves the function of a multiplexer which typically provides a control circuit to the power TFT 66 in response to analog voltages, which are presented on the drive line 74. Further, the multiplexer includes a drive transistor 66 connected to a first power supply and the EL light-emitting elements for regulating current from the power supply to the EL light-emitting elements and a plurality of current control circuits 70, 72; each connected to a gate electrode 68 of the drive transistor 66 and comprising a write transistor 74a, 74b, a storage element 76a, 76b and a read transistor 78a, 78b. In this embodiment, the active matrix circuit includes at least a first and a second current control circuit 70, 72 and a select line connected to a gate electrode of each write transistors 82a, 82b and a read out line 84a, 84b connected to a gate electrode of each read transistor 80a, 80b within each current control circuit 70, 72.

Figure 5:
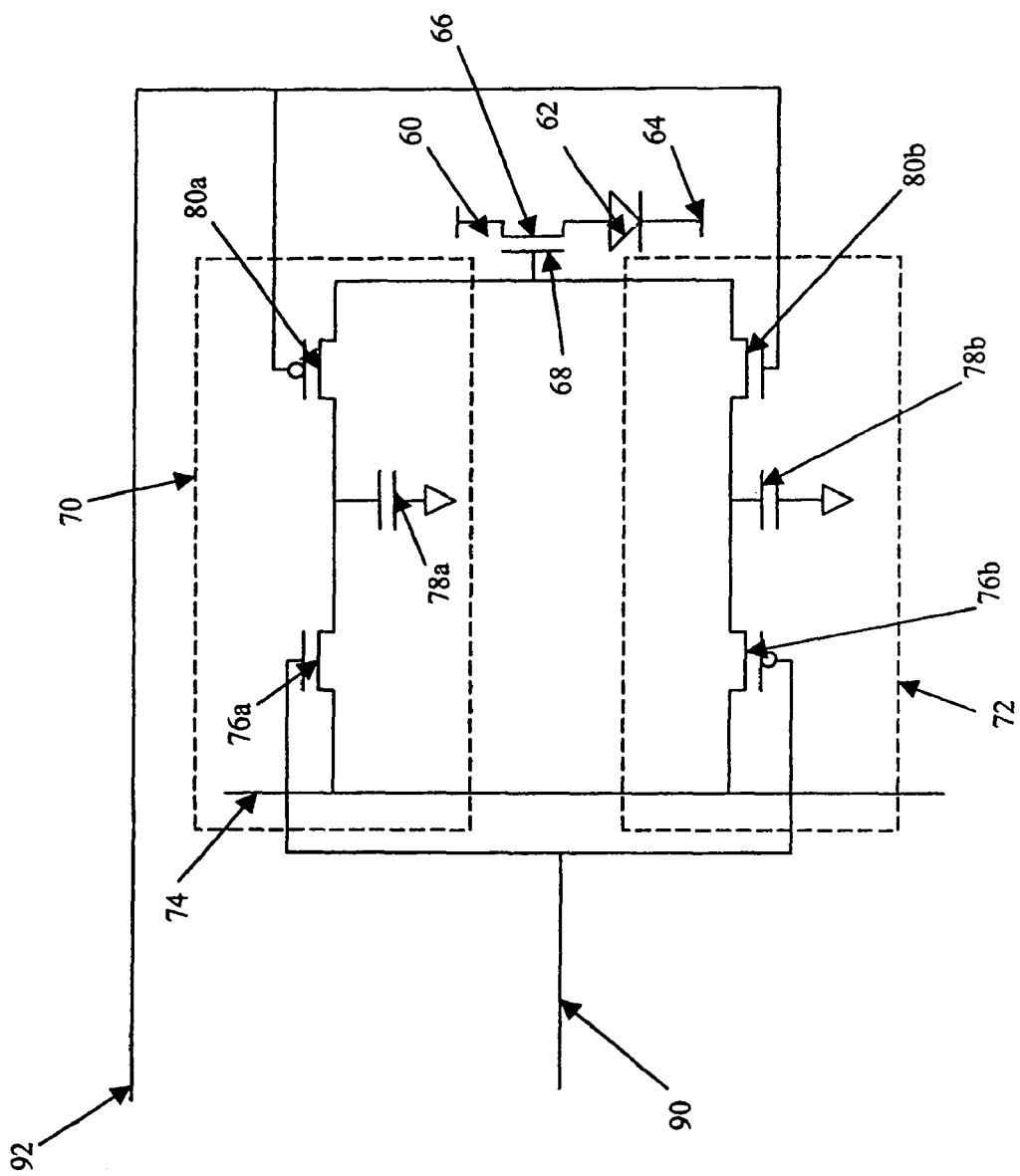
FIG. 5 is an active matrix circuit useful in another analog embodiment of the present invention.

It will be recognized by one skilled in the art that numerous active-matrix circuits may be employed in embodiments of the present invention that provide the function of one or more multiplexers. For example, additional components may be added to each or shared between the current control circuits 70, 72 or the circuits may respond as a function of current rather than voltage. Further, certain simplifications of the active matrix circuit are possible. An alternate active-matrix circuit including one such simplification is shown in FIG. 5. This active matrix circuit can be formed using a CMOS process, rather than an NMOS or PMOS process, any of which could have been used to form the circuit shown in FIG. 4. However, since this circuit is formed with a CMOS process, the write transistor 76a can be formed of a first doping, p or n, forming either a PMOS or NMOS TFT while the write transistor 76b can be formed of a second doping, forming the alternate of the PMOS or NMOS TFT used to form the write transistor 76a. As such, positive voltage can be applied to write line 90 to select one of the current control circuits 70 or 72 for writing while a negative voltage can be applied to the same write line 90 to select the other of the current control circuits 70, 72 for writing. Similarly the read transistor 80a can be formed of a first doping forming either a PMOS or NMOS TFT while the read transistor 80b can be formed of a second doping, forming the alternate of the PMOS or NMOS TFT used to form the read transistor 80a. As such, a positive voltage can be applied to the read out line 92 to select either of the current control circuits 70 or 72 for reading while a negative voltage can be applied to the same read out line 92 to select the complimentary of the current control circuits 70, 72 for reading. As such the EL device 40 can be comprised of a first and a second current control circuit 70, 72 and the write transistor 76a of the first current control circuit 70 is a transistor of a first doping and the write transistor 76b of the second current control circuit 72 are transistors of a second doping. Similarly, the EL device can be comprised of a first and a second current control circuit 70, 72 wherein the read transistor 80a of the first current control circuit 70 is a transistor of a first doping and the read transistor 80b of the second current control circuit 72 are transistors of a second doping. In these circuits common write 90 or read out 92 lines can be shared between the current control circuits 70, 72.

Figure 6:
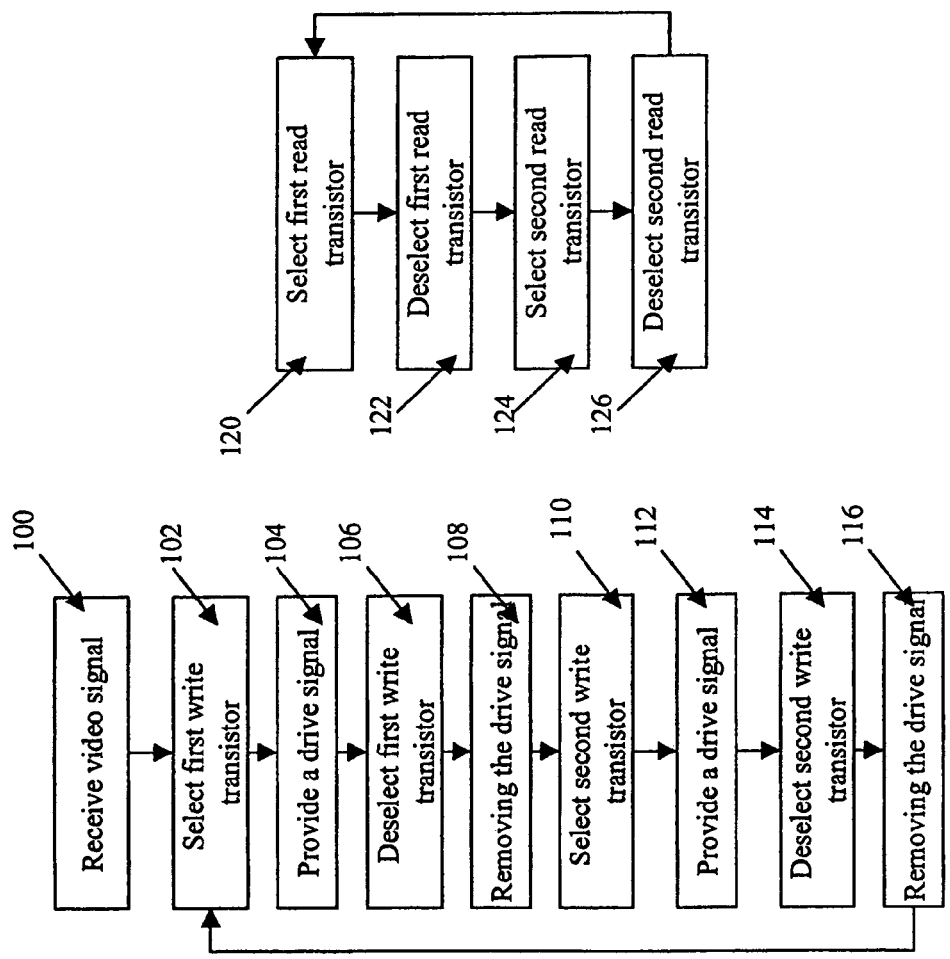
FIG. 6A is a flow chart depicting a method of driving the active matrix circuits of FIG. 4 or FIG. 5.

A method for describing the EL display system 40 shown in FIG. 3, (which employs the active matrix circuits shown in FIG. 4 or FIG. 5), is provided in FIG. 6. As shown, this method includes the steps of receiving 100 at least one video signal representing a sequence of image signals. In some embodiments, this video signal may include separate sequences of images to be displayed to each eye of an observer when the EL device of the present invention is a stereoscopic display, or additional views when the EL device of the present invention is a multi-view 3D display. Upon receiving this signal, the first write transistor is selected 102. This write transistor is selected when a row driver 58 places a select signal on a write line 90. The system provides 104 a drive signal representing a pixel in a first eye view of the image signal to the first current control circuit. For example, the column driver 56 places a voltage onto the drive line 52 of FIG. 3 or 74 of FIGS. 4 and 5. Because TFT 76a is selected, the drive voltage will be stored on storage capacitor 78a. The system then deselects 106 the write transistor within the first current control circuit. For example, the row driver 58 removes the select signal on the write line 82a, 90. The drive signal is then removed 108 from the drive line 74. Next, the write transistor within the second current control circuit is selected 110. This is typically performed by the row driver 58 by placing a signal on the write line 82b, 90. A different drive signal representing a pixel in a second image signal is provided 112 to the second current control circuit by placing the signal on the drive line 74 and this voltage creates a charge on the storage capacitor 78b. When storage capacitor 78b has been charged, the write transistor within the second control circuit is deselected 114 and the drive signal is removed 116 from the drive line 74. Steps 102 through 116 are repeated for each image signal within the sequence of image signals with each current control circuit potentially receiving a different eye's view, if the EL device is a stereoscopic or 3D display system. Simultaneously read transistors 80a and 80b will be alternately selected 120, 124 and deselected 122, 126 within the first and second current control circuit, at a frequency that is higher than the frequency at which each of the read transistors are selected and deselected. As such, the signal source, (e.g., the column driver 56 within this example) provides a plurality of drive signals to the storage capacitors 78a, and 78b, each drive signal being provided for a first amount of time, which is dictated primarily by the first frequency and a controller Row driver 54 provides signals to the read transistors for providing a succession of values of the selection signal, each value being provided for a second amount of time, shorter than the first amount of time as the select signals for the read transistors 80a, 80b are operated at a higher frequency than the write transistors 76a, 76b. This method for driving the active matrix EL device may be used to present a sequence of image signals corresponding to a stereoscopic image comprised of image pairs representing different views of the same image; including at least a left perspective image and a right perspective image at a higher rate than other systems known in the art.

Figure 7:
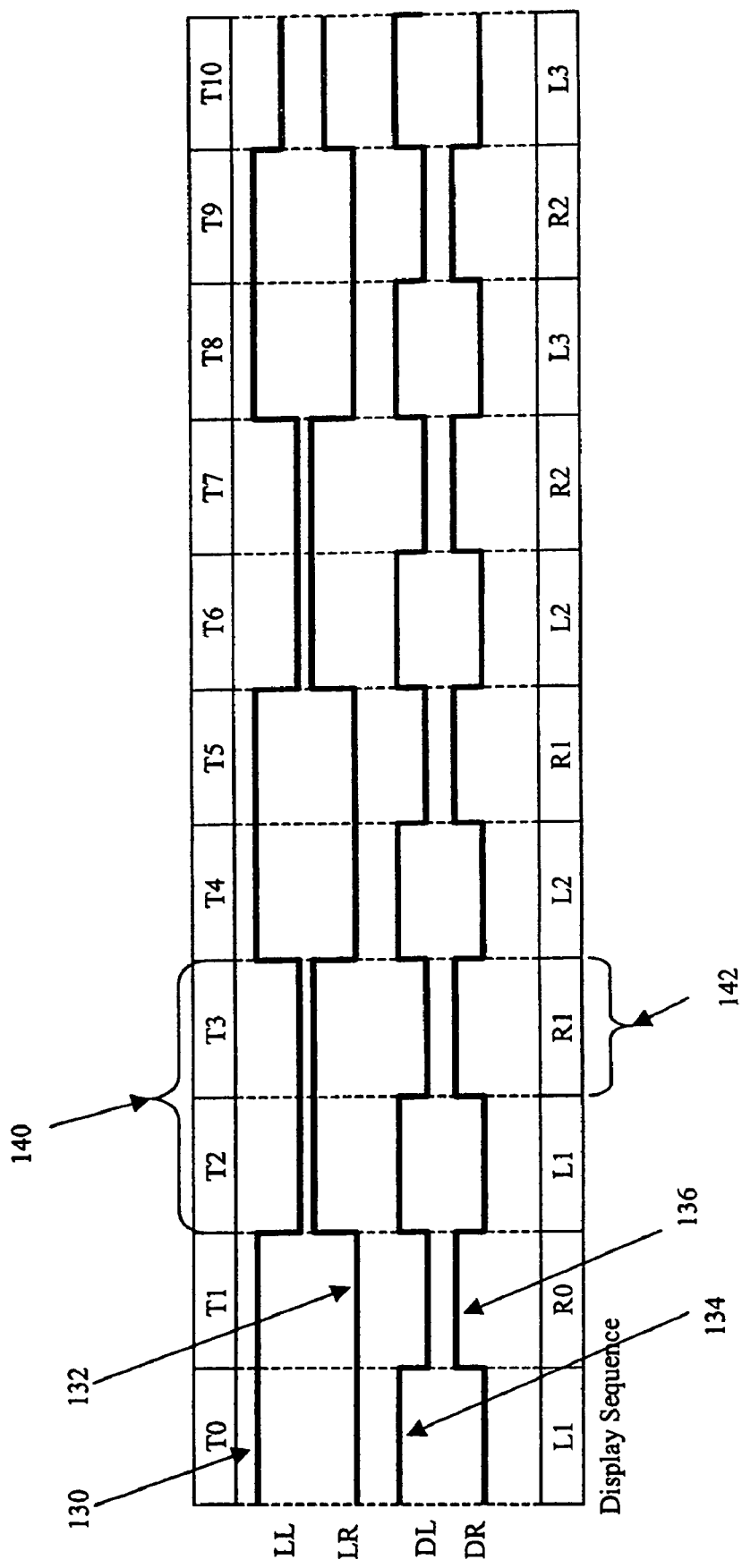
FIG. 7A is a timing diagram depicting the load and drive periods provided to drive the active matrix circuits of FIG. 4 or FIG. 5.

To further illustrate this method, a timing diagram, with several signal waveforms, is shown in FIG. 7. Signal waveform 130 is applied to write transistor 76a of the first current control circuit 70. A signal waveform 132 is applied to write transistor 76b of the second current control circuit 72. A signal waveform 134 is applied read transistor 80a of the first current control circuit 70, and a signal waveform 136 to be applied to read transistor 80b of the second current control circuit 70. These waveforms are shown for 11 clock cycles (T0 through T10) and illustrates images that may be displayed from an input video signal containing left (L) and right (R) image pairs from a video image sequence. Note that the symbols L0 and R0 represent times that the first left and right eye images of a stereo image pair are displayed. Subsequently L1 and R1 represent times that the second left and right eye images of a stereo image pair are displayed. As shown in this Figure, near the same time a high select signal is placed on the signal waveform 130, allowing the drive signal to be written to the current control circuit 70, a high select signal occurs for the waveform 134, allowing a drive signal to charge the capacitor 78a to be presented to the drive transistor 66. After one clock signal the waveform 134 drops low and the waveform 136 goes high allowing the signal stored on storage capacitor 78b from the previous right eye image to be provided to the EL light-emitting diode 64. After a second clock cycle, beginning at T2, all of the waveforms change and data is written to the second current control circuit 72, while data is read from the first current control circuit 70. After the third clock cycle, beginning at T3, the signals of the waveforms 134 and 136 are reversed, allowing the signal stored on storage capacitor 76a to be provided to the EL light-emitting diode 64. Upon completion of this clock cycle, the system returns to its original status. This sequence of events is repeated. As shown in this figure, each load period 140 requires two clock cycles (e.g., T2 and T3) while each display period 142 requires only a single clock cycle (e.g., T3). As such, the time spent loading the image data signals 24 into each of the storage capacitors 78a, 78b, can be twice as long as the time that each current control circuit 70, 72 provides the control signal 30 to the drive TFT 68. Therefore, the control signal 30 can be switched two times within each load period 140, hence improving the perceived refresh rate of the display to avoid flicker for a viewer.

In the example that is illustrated in FIG. 7, the signal source provides a first image data signal (e.g., LL) and a second image data signal (e.g., LR), sequentially. As indicated, these first and second image data signals may be intended to provide image information for two different viewing positions, such as a left stereoscopic image and a right stereoscopic image. As shown, the controller also provides a first selection signal (e.g., DL) for controlling the onset and disablement of the display period of the image to a first viewing position and a second selection signal (e.g., DR) for controlling the onset and disablement of the display period of the image to a second viewing position. Note that in this exemplary embodiment, the first selection signal DL is in phase with the first image data signal LL and the second selection signal DR is out of phase with the second image data signal LR. It should be noted, however, that this relationship is not required, nor is it required that there be only two image data signals or selection signals. However, the signal source will generally provide a plurality of image data signals sequentially. Further, the controller will typically provide a succession of values of the selection signal in a selected phase relationship with the plurality of sequential image data signals.

Figure 8:
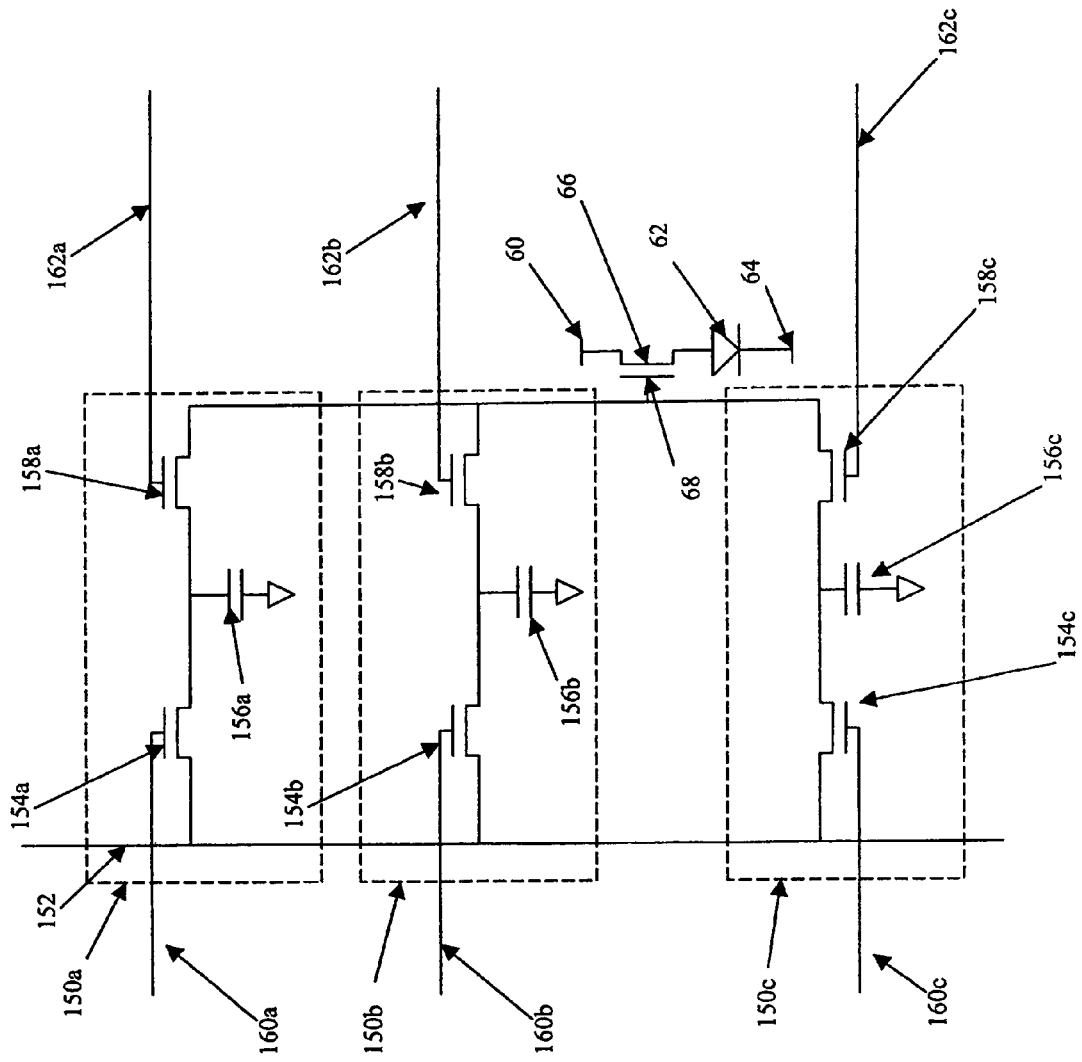
FIG. 8 is an active matrix circuit useful in another analog embodiment of the present invention.

Although FIG. 5 shows an active matrix circuit having two current control circuits 70, 72 the present invention is not limited to active matrix circuits or multiplexers providing only two current control circuits. For example, FIG. 8 provides an active matrix circuit providing three current control circuits 150a, 150b, and 150c. Such active matrix circuits can be advantageously applied in multiview displays that provide at least three views of each image or can be applied to advantage in displays having only two views of each image as in conventional stereoscopic displays.

As shown in FIG. 8, the circuit modulates the flow of current from a power supply line 60 through a light-emitting diode 62 to ground 64; by controlling voltage on gate 68 of drive transistor 66, interleaving image data by alternately displaying the control signal from at least two of the current control circuits 150a, 150b, 150c. In this exemplary embodiment, the controller provides a succession of values of the selection signal on the select lines 160a, 160b, 160c to select among current control circuits 150a, 150b, 150c to load data, by applying a signal to the gates of one of the write transistors 154a, 154b, 154c. The signal source provides a plurality of image data signals for a specified load period on drive line 152. Depending upon the selection signal on each of the select lines 160a, 160b, 160c, the load data signal will be loaded onto one of the storage elements 156a, 156b, and 156c. Synchronously with the load period, the controller alternately provides a signal to at least two of the read out lines 162a, 162b, 162c to alternately activate at least two of the read transistors 158a, 158b, 158c to allow the control signal stored on at least two of the storage elements 156a, 156b, 156c to be provided to gate 68 of the drive transistor 66 to direct the electro-luminescent device, (i.e., the light-emitting diode 62) to emit light. The controller will provide a signal to each of the at least two of the read out lines 162a, 162b, 162c for shorter periods of time than it provides to the select lines 160a, 160b, 160c to provide display periods that are shorter than the load period.

The active-matrix circuit of FIG. 8 can be driven in alternately useful ways. In a first method, the active matrix circuit of FIG. 8 is driven using a method similar to the one depicted in FIGS. 6 and 7 in which data is loaded into each of the current control circuits while the data is synchronously read from each of the current control circuits to provide three separate current control signals to the light-emitting diode 62 within the load period. This method can be applied to enable a display that provides the user with at least three views of the same image in a multiview display. The circuit is modified by adding additional current control circuits to provide additional views by increasing the number of control signals that the multiplexer selects among.

Figure 9:
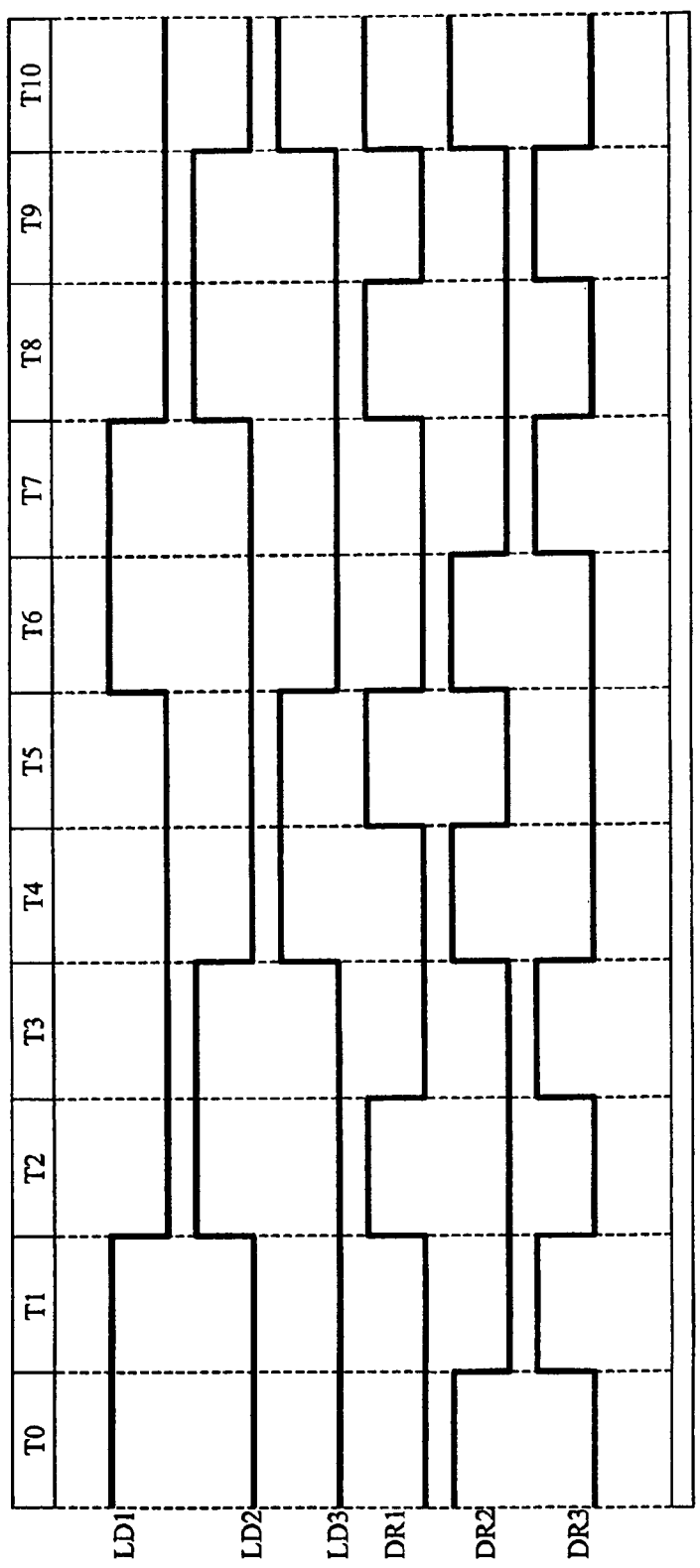
FIG. 9 is a timing diagram depicting the load and drive periods provided to drive the active matrix circuit of FIG. 8.

In an alternative method, current control circuits 150a, 150b, and 150c serve unique roles within each load period. For example, within any load period, one pair of the current control circuits 150a, 150b, 150c serve the function of output current control circuits. That is they are exclusively selected only for reading within a given load period such that the succession of selection signal values on the read out lines 162a, 162b, 162c causes interleaving of the image data from the output current control circuits. Simultaneously at least one of the current control circuits 150a, 150b, 150c is employed as an input current control circuit. A signal source provides an image data signal to the input current control circuit during a period that the read transistor is connected to the input current control circuit, is not selected to allow the input current control circuit to provide a voltage to the gate 68 of the drive transistor 66. Driving this circuit in this manner provides an advantage to the circuit shown in FIG. 5 in that, each current control circuit is only selected for loading or reading at any point in time. An exemplary timing diagram corresponding to this method is shown in FIG. 9. As shown, there are six waveforms, three of the waveforms represent waveforms provided on select lines 160a, 160b, 160c. These waveforms are designated as LD1, LD2, LD3, respectively. Three of the waveforms are provided on read out lines 162a, 162b, and 162c and are designated as DR1, DR2, and DR3 respectively. As shown only one of the select lines 160a, 160b, 160c receives a high voltage pulse, indicating a load period, within any clock period, indicated by T1 through T10. Therefore, only one of the current control circuits 150a, 150b, 150c is selected for receiving an image data signal at any point in time and is therefore designated as the input current control circuit. Simultaneously, read transistors 158a, 158b, 158c in current control circuits 150a, 150b, 150c that do not receive a high voltage pulse on select lines 160a, 160b, and 160c within any load period. Each alternatively receives a high voltage pulse on read out lines 162a, 162b, 162c allowing the control signal stored within the storage elements to be provided to gate 68 of the drive transistor 66. These current control circuits function of as current control circuits. At the end of each load period, however, a different select line provides a high voltage pulse to a different one of the read transistors, such that the current control circuit containing the read transistor becomes the input current control circuit; and the two remaining current control circuits become the output current control circuit. As described, this active matrix circuit is comprised of a pair of output current control circuits and at least one input current control circuit. The succession of selection signal values causes interleaving of the image data from the output current control circuits and the signal source provides an image data signal to the input current control circuit. As before, note that each load period defined by a high voltage pulse within the signals LD1, LD2, LD3 has a duration of at two clock cycles while the display period, defined by a high voltage pulse within the signals DR1, DR2, DR3 has a duration of only one clock cycle, hence providing a display period that is shorter than the load period.

Within the active matrix circuits shown in FIG. 5 and FIG. 8, storage elements 78a, 78b, 156a, 156b, 156c have been depicted as storage capacitors. While a storage capacitor may readily fulfill this function, other elements may provide the same function. For example, one or more of the storage elements 78a, 78b, 156a, 156b, and 156c may be formed from a ring buffer.

In another embodiment of the present invention, a digital drive method can be applied, wherein each image signal is a corresponding pulse-width modulated waveform, and wherein the control signal is a portion of the pulse-width modulated waveform selected by the selection signal as discussed in International Publication Number WO 2006/020511, by Kawabe, entitled, "Emissive Display Device Driven in Subfield Mode and Having Precharge Circuit". However, the digital method of the present invention employs a drive circuit for rapidly interleaving image data displayed on an EL device, wherein the drive circuit is comprised of a signal source that provides a plurality of image data signals. Each image data signal is provided for a specified load period. A multiplexer receives the image data signals, and in response to a selection signal, selects one of the image data signals to provide a control signal that directs the EL device to emit light. A controller provides a succession of values of the selection signal. The succession of selection signal values causes interleaving of the image data during multiple display periods, each selection signal value is provided for one display period and each display period is shorter than the load period.

Figure 10:
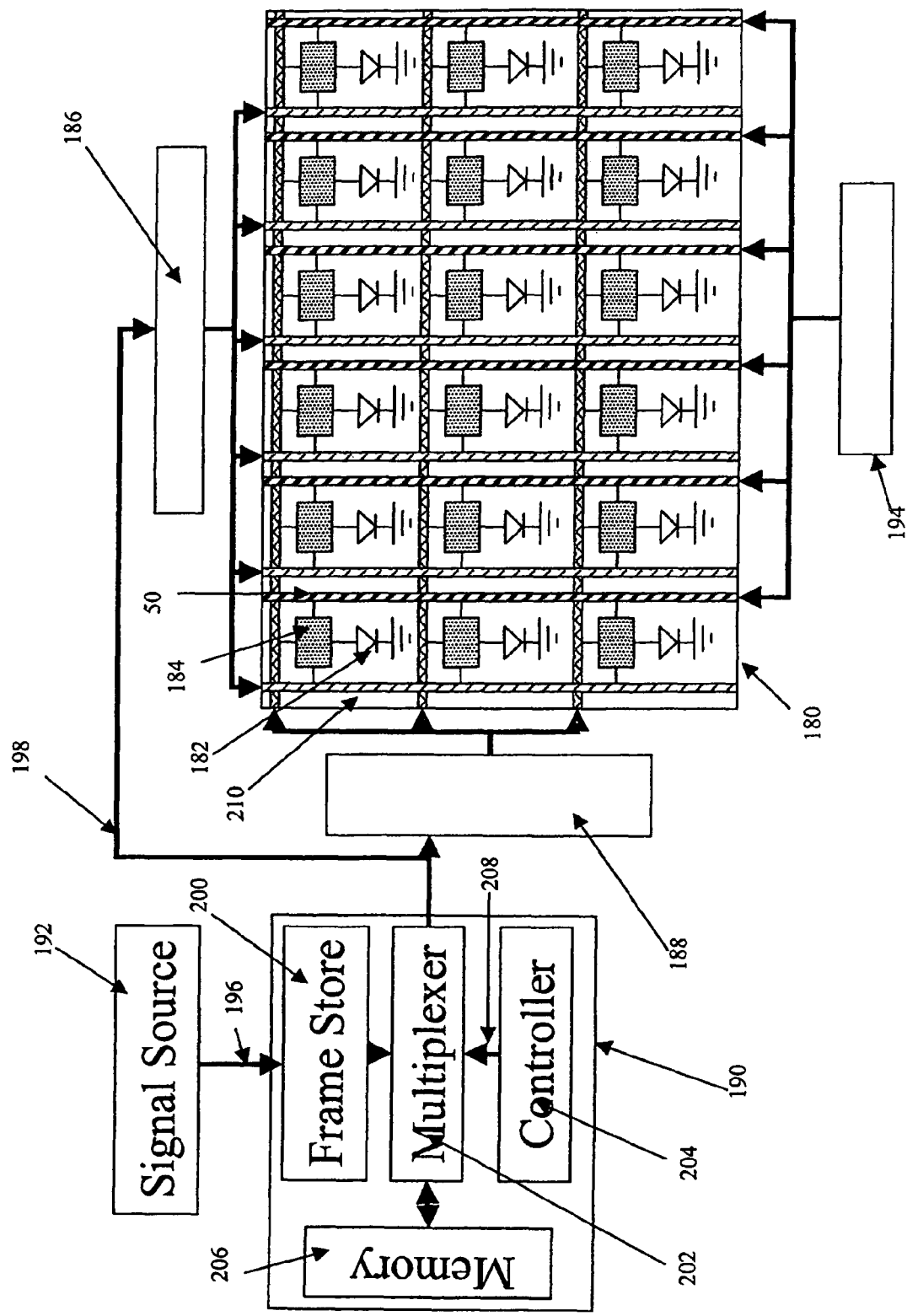
FIG. 10 is a block diagram of an EL display system for providing a pulse width modulated embodiment of the present invention.

For example, an exemplary embodiment of a digital drive method can be embedded into an EL display system, such as the EL display system shown in FIG. 10. As shown in this Figure, the EL display system includes a substrate 180 on having an array of one or more EL light-emitting diodes 182; each diode corresponding to the EL light-emitting element 32 of FIG. 2 and an array of drive circuits 184. Also shown is a column driver 186, a row driver 188, a digital processor 190, a signal source 192 and a power supply 194. Within this exemplary embodiment, the digital processor 190 receives of image data signals 196, each image data signal, being provided for a specified load period. The digital processor 190 can temporarily store these image data signals into a frame store 200. The digital processor 190 can include a multiplexer 202 for receiving the plurality of image data signals 196 and in response to a selection signal 208 provides a control signal 198 to the column 186 and row 188 drivers. Within this embodiment, the digital signal processor 190 divides each of the image data signals 196 into more than one control signal 198. For example, if the image data signals have a gray scale resolution of 4 bits, each of the image data signals is divided into a first control signal containing the information within the three lowest order bits and a second control signal containing the information within the highest order bit. The digital processor 190 provides the first control signal to the row 188 and column 186 drivers while storing the second control signal for each image data signal within the memory 206. The digital processor 190 completes this processing step for each light-emitting diode 182 within the EL display system. The digital processor 190 additionally includes a controller 204, for example, a timing generator, for providing a succession of values of the selection signal 208, the succession of selection signal values causing interleaving of the image data during multiple display periods. Therefore, once the digital processor 190 has provided the first control signal to the column 186 and row 188 drivers, the digital processor 190 receives another image data signal 196 and divides the image data signal into a third and a fourth control signal. The third control signal contains the three lowest order bits and the fourth control signal contains the highest order bit. The third control signal can be provided to the column 186 and row 188 drivers, while the fourth control signal is stored into memory 206. Again in response to the selection signal 206, the multiplexer retrieves the second control signal from memory for each pixel the EL display system and provides this control signal 198 to the row 188 and column 186 drivers. Once this is complete, the multiplexer 202, in response to the selection signal 206, retrieves the fourth control signal from memory for each pixel in the EL display system and provides this control signal 198 to the row 188 and column 186 drivers.

Within this embodiment, column 186 and row 188 drivers provide signals in response to the first, second, third and fourth control signals that are pulse width modulated waveforms. That is, column 186 and row 188 drivers convert the control signals to pulse-width modulated drive signals that are provided to the drive circuits 184 through data lines 210. Note that in this embodiment, the selection signal 208 includes a succession of signal values that impact the interleaving of the image data. Also note that since each of the first, second, third, and fourth control signals provide a pulse-width modulated waveform to each EL device, each control signal is a selected portion of a pulse-width modulated waveform. Further note that in this embodiment, the load period is the time required to load both the image data signals in to digital processor 190 while the display period is the time required to display each of the portions of the pulse width modulated waveforms. As described, the display will provide four display periods within the same time required to complete two load periods. As such, the display periods will each be shorter than either of the load periods.

Figure 11:
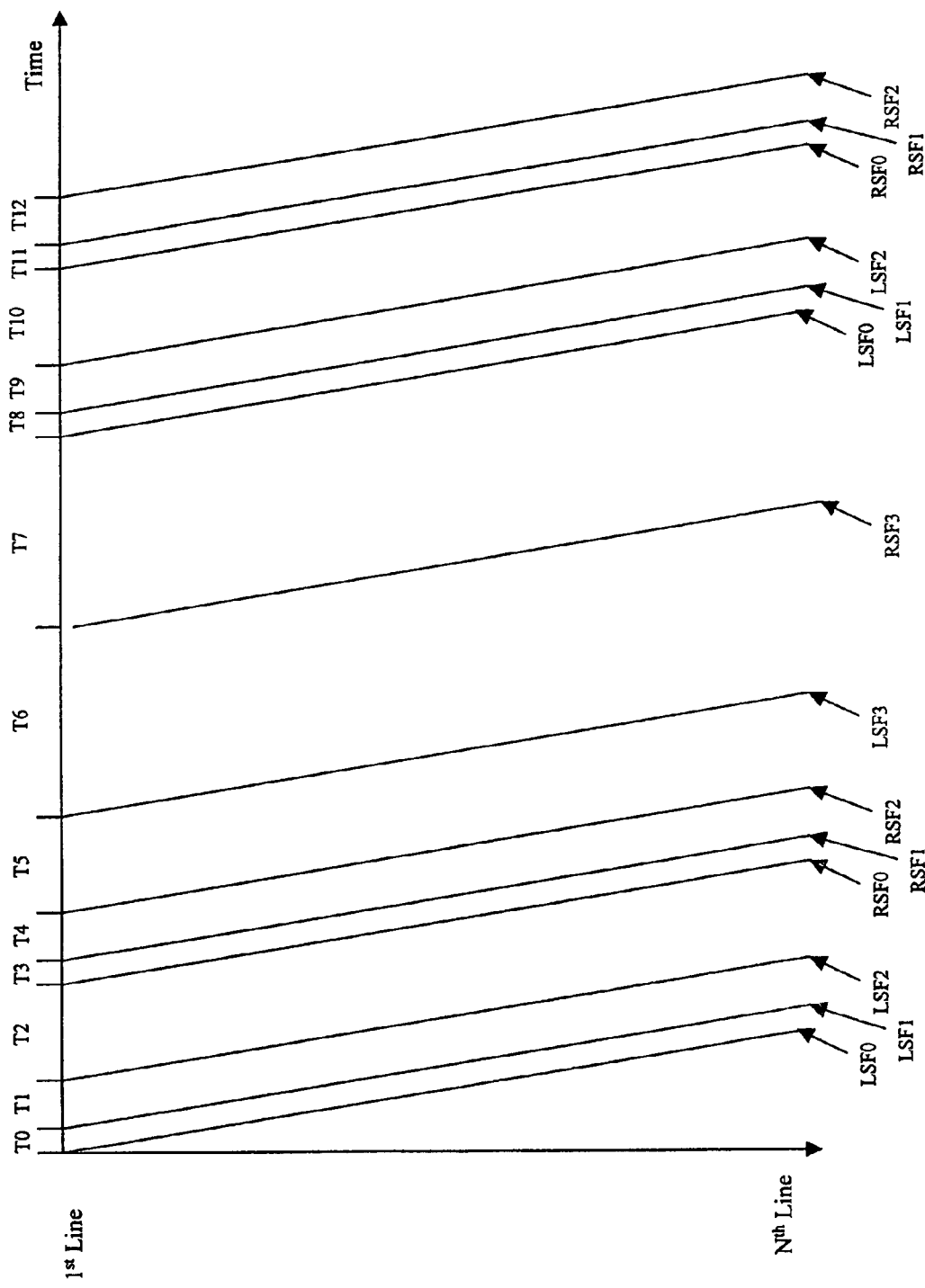
FIG. 11 is a timing diagram depicting the order of drive signals according to a pulse width modulated embodiment of the present invention.

FIG. 11 shows a timing diagram for an EL display system employing a drive circuit of the present invention, wherein the EL display system additionally includes an active optical layer for changing the properties of light presented by the EL display, such that the light generated by the light-emitting diodes in response to the first and third control signals are provided to only the left eye of the observer, while the light generated by the light-emitting diodes in response to the second and fourth control signals are only provided to the right eye of the observer. Note that the slanted lines labeled LSF0 through LSF3 and RSF0 through RSF3 represent the activation of the diodes on the EL display. The designation L indicates that a control signal is provided to provide light to the left eye, while R indicates a control signal is provided to provide light to the right eye. The designation 0 through 3 indicate the bit level of the signal. In this example, the image data signal has a 4 bit resolution. The vertical axis in this figure, indicates the line of light-emitting diodes in the display that is activated and the horizontal axis indicates the passage of time. As shown in this chart, as the first control signal is provided to the row and column drivers, a pulse width modulated signal is generated by the row and column drivers to provide the three lowest order bits as drive signals LSF0, LSF1, and LSF2. These control signals are provided to each light-emitting diode on each row simultaneously and swept down each row of the display to provide an image to the left eye of the user in response to a first left eye image data signal. At the end of time T2, the third control signal is provided to the row and column drivers and a pulse width modulated signal is generated by the row and column drivers to provide the three lowest order bits as drive signals RSF0, RSF1, and RSF2. These control signals are provided to each light-emitting diode on each row simultaneously and swept down each row of the display to provide an image to the right eye of the user in response to a first right eye image data signal. At the end of T5, the second control signal is provided to the row and column drivers and a pulse width modulated signal is generated by the row and column drivers to provide the highest order bit as drive signal LSF3. These control signals are provided to each light-emitting diode on each row simultaneously and swept down each row of the display to provide an image to the left eye of the user in response to a first left eye image data signal. At the end of T6, the fourth control signal is provided to the row and column drivers and a pulse width modulated signal is generated by the row and column drivers to provide the highest order bit as drive signal RSF3. These control signals are provided to each light-emitting diode on each row simultaneously and swept down each row of the display to provide an image to the right eye of the user in response to a first right eye image data signal. As such, the EL display system has acquired two image data signals corresponding to a left and right eye image and displayed information for four display periods corresponding to these two image data signals.

In this example, each image data signal is divided into two control signals and each control signal is used to generate a drive signal for each light-emitting diode of the display. However, it is not required that the drive circuit on the EL display system divide each image data signal into two control signals as each image data signal can be divided into more than one control signal to allow the device to rapidly interleave the image data provided by the image data signals. This division can be accomplished in any number of ways. For example, the highest order bit itself can be divided into two separate control signals, which bracket the control signals provided by the lower order bits as the display period (e.g., T6 or T7) corresponding to displaying the highest order bit will generally be twice as long as the display period corresponding to displaying the lower order bits (e.g., the display period represented by the sum of T0, T1, T2 or the sum of T3, T4, T5). Interleaving the six resulting control signals further reduces the likelihood of perceived flicker when viewing a stereoscopic display of the present invention.

The drive circuit for rapidly interleaving image data of the current invention can be applied in an EL display. The application of this drive circuit provides an EL display comprising an array of EL devices, each EL device emitting light in response to a control signal. The EL display will additionally include an array of drive circuits for providing control signals, each drive circuit having a multiplexer for receiving image data signals, and in response to a selection signal, selecting one of the image data signals to provide the control signal. Additionally, the display will include a signal source for providing image data signals, each image data signal, being provided for a specified load period. The display will additionally include a controller for causing interleaving of the image data during multiple display periods, each display period being shorter than the load period.

This display will typically include a two dimensional array of EL devices. These devices will include electro-luminescent layers in contact with a pair of electrodes, including a cathode and an anode. The electro-luminescent layers can include purely organic small molecule or polymeric materials, typically including organic hole transport, organic light-emitting and organic electron transport layers as described in the prior art, including U.S. Pat. No. 4,769,292, issued Sep. 6, 1988 to Tang et al., and U.S. Pat. No. 5,061,569, issued Oct. 29, 1991 to VanSlyke et al. The electro-luminescent layers can alternately be formed from a combination of organic and inorganic materials, typically including organic hole transport and electron transport layers in combination with inorganic light-emitting layers, such as the light-emitting layers described in U.S. Pat. No. 6,861,155 issued Mar. 1, 2005 to Bawendi et al. Alternately, the electro-luminescent layers can be formed from fully inorganic materials such as the devices described in co-pending US Publication No. 2007/0057263, published Mar. 15, 2007, entitled, "Quantum Dot Light Emitting Layer".

Figure 12:
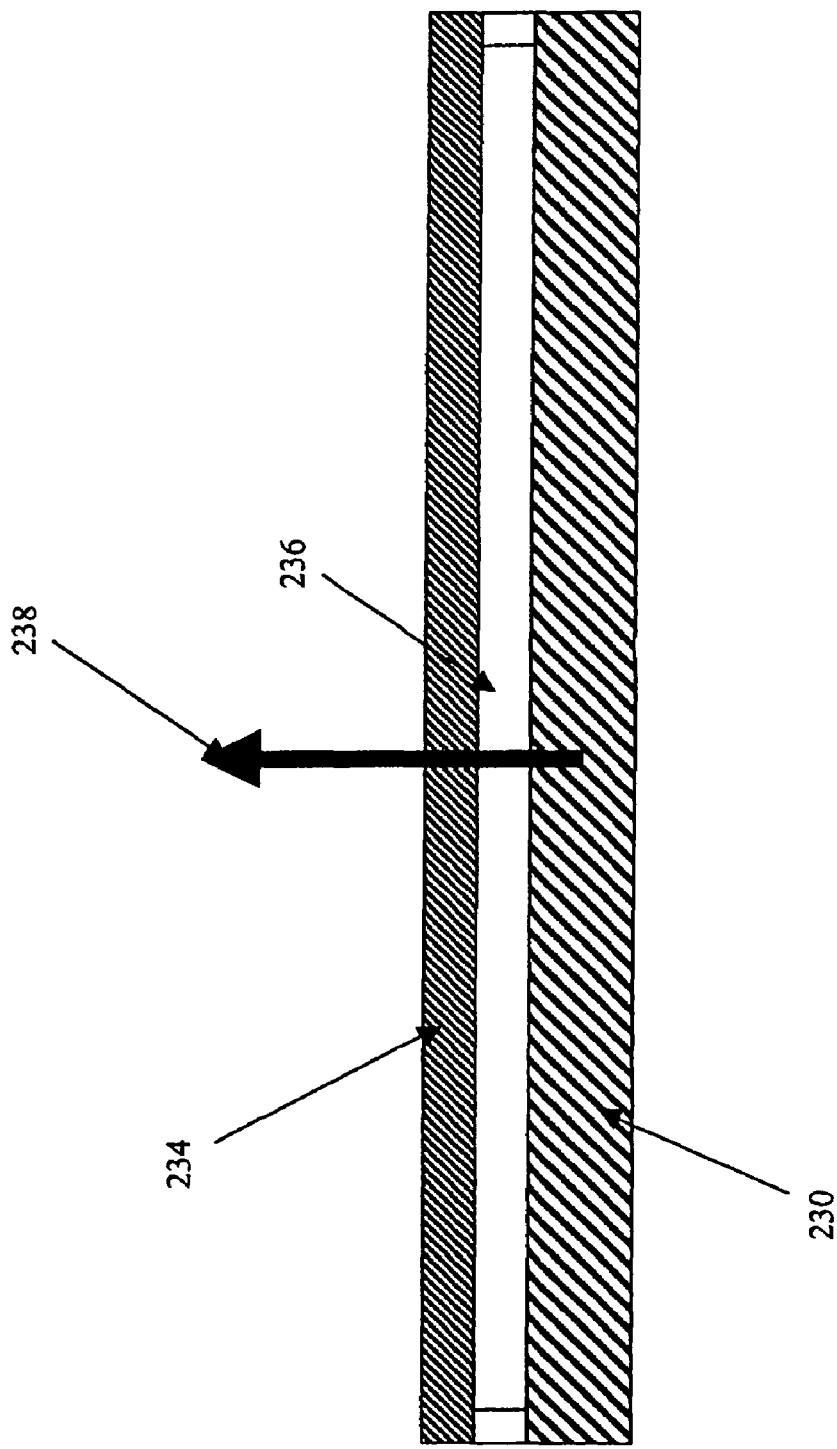
FIG. 12 is a block diagram depicting the elements of a stereoscopic or 3D display employing the drive circuit and EL display system of the current invention.

The present invention can be particularly useful in displays that simultaneously provide multiple views or multiple sets of data. In certain embodiments, the EL display will be a stereoscopic or 3D display. In stereoscopic display embodiments, the image data signals will include exactly one left eye image data signal and one right eye image data signal. In 3D display embodiments, the image data signals will include at least one left eye image data signal and at least one right eye image data signal. In many embodiments, the stereoscopic or 3D display will further comprise an active optical layer for changing an optical property of the emitted light in synchronization with changes in the selection signal. An EL display system, which includes a drive circuit of the present invention and an active optical layer is shown in FIG. 12. As shown in such a stereoscopic or 3D display, the EL display 230 emits light in a direction 238, such that the light passes through the active optical element 234. In some embodiments, this active optical element may be separated from the EL display 230 by an intermediate layer 236, which provides a low optical index, such as air. However, such an intermediate layer 236 is not required. Any such active optical layer can be employed, but such optical layers will include a switchable polarizer or optical elements having a variable optical power, including polarization-activated microlenses or active lenses, as described by Woodgate and Harrold in the Society for Information Display Journal article entitled, "Efficiency analysis of multi-view spatially multiplexed autostereoscopic 2-D/3D displays" or Woodgate and Harrold in U.S. patent application Ser. No. 10/563,118, entitled, "Lens Array Structure". In especially useful embodiments, the active optical layer will be segmented into rows or pixellated regions to allow the synchronization of the active optical layer with individual rows or groups of rows of EL devices such that the optical property of the light created by the EL device is switched synchronously with a change in the control signal; such that when light intended for a first view is interleaved with light that is intended for a second view, the optical property of the light created for each view can be switched to be viewed from different spatial locations.

As discussed in earlier examples, in some embodiments the signal source will be a column driver and the drive circuit can be an active matrix pixel circuit containing one or more storage elements. In these embodiments, the controller will typically be a row driver, but the controller may be provided within a column driver. In other embodiments, specifically in embodiments employing digital drive methods, which include pulse width modulated signals, the drive circuits and controller are embedded in a digital processor or within the column driver. The control signals are provided to the column driver or to column lines to drive the EL devices with interleaved image data.

It is possible to employ the drive circuit of the present invention, not only to rapidly interleave image data from multiple images to reduce the likelihood of flicker when presenting multiple images, as is common in 3D displays, but to use the drive circuit to present an input data signal having increased gray scale resolution. Therefore, the same drive circuit can provide a plurality of input data signals having a first resolution and in response to a mode signal provide the input data signals as image data signals or divide the input data signals into image data signals of a second resolution, wherein the second resolution is lower than the first resolution. In such an embodiment, the signal source provides a mode signal indicating, for example, whether a portion of the input data signals represents a single image having a larger gray scale resolution or more than one image having a smaller gray scale resolution. The previous embodiments have described the behavior of the system when the input data signals include signals for multiple images displayed simultaneously. Therefore, only the behavior of the drive circuit or display system employing the drive circuit wherein a portion of the input data signals represent a single image having a larger gray scale resolution will be described here. It should be noted, however, that it is not required that the control signals provide the same gray scale resolution as the gray scale resolution of the input data signals and the drive circuit or display system can reduce the gray scale resolution of the input data signals when generating the control signals.

When the mode signal indicates an image having a higher gray scale resolution, the gray scale signal is divided into two or more separate intermediate control signals. For example, if the higher gray scale resolution is 8 bits and the lower gray scale resolution is 7 bits, two separate intermediate control signals are formed from the 8 bit image data signals. A first intermediate control signal is formed by shifting the value of the input image signals to perform an integer division by 2 of the input image signals. A second intermediate control signal is formed by adding any remainder from this shift operation to the first intermediate control signal. In this way, two, 7 bit intermediate control signals are formed, each having a lower gray scale resolution than the higher gray scale resolution 8 bit input image signals. These 7 bit control signals are each displayed as described within any of the previous embodiments, wherein the intermediate control signals are treated as the input image signals described within these embodiments. By performing this operation and displaying this information in this way, an image having a higher gray scale resolution is displayed. In systems employing an active optical layer to create a 3D display, this active optical layer is adjusted to provide the same image to each viewing location during the time that the higher gray scale resolution input image signals are being displayed; and the display produces an image having twice the luminance during this time. As the requirements for gray scale resolution increase with increases in display luminance, this mode provides a perceived higher image quality when displaying images having a single view.

The invention has been described in detail with particular reference to certain preferred embodiments thereof, but it will be understood that variations and modifications can be effected within the spirit and scope of the invention.

PARTS LIST 2 portion of a circuit
4 separate portion of a circuit
6 power supply
8 OLED
10 TFT
12a,b TFTs
20 drive circuit
22 signal source
24 image data signals
26 multiplexer
28 selection signal
30 control signal
32 light
34 controller
36 RGB input signal
40 substrate
42 EL light-emitting diodes
44 ground
46 active matrix circuit
48 power line
50 power supply
52 data line
54 select line
58 row driver
60 power line
62 EL light-emitting diode
64 ground
66 drive TFT
68 gate of drive TFT
70 current control circuit
72 current control circuit
74 drive line
76a, b write transistor
78a, b storage capacitors
80a, b read transistor
82a, b write lines
84a, b read lines
90 write line
92 read out line
100 receiving step
102 select step
104 provide signal step
106 deselect step
108 remove step
110 select step
112 provide step
114 deselect step
116 remove step
120 select step
122 deselect step
124 select step
126 deselect step
130 signal waveform
132 signal waveform
134 signal waveform
136 signal waveform
140 load period
142 display period
150a, b, c current control circuit
154a, b, c write transistor
156a, b, c storage element
158a, b, c read transistor 160a, b, c select line
162a, b, c read out line
180 substrate
182 EL light-emitting diode
184 drive circuit
186 column driver
188 row driver
190 digital processor
192 signal source
194 power supply
196 image data signals
198 control signal
200 frame store
202 multiplexer
204 controller
206 memory
208 selection signal
210 data lines
230 EL display
232 direction
234 active optical element
236 intermediate layer
LD1, 2,3,4 waveform
DR1, 2, 3, 4 waveform

What is claimed is:

1. A drive circuit for rapidly interleaving image data displayed on an EL device, the drive circuit comprising:
 a. a signal source that provides a plurality of image data signals, each image data signal being provided during a specified load period;
 b. a multiplexer for receiving the plurality of image data signals, and in response to a selection signal selecting one of the plurality of image data signals to provide a control signal that directs the EL device to emit light; and
 c. a controller causing interleaving of the image data during multiple display periods, each display period shorter than the load period;
 wherein
  the signal source provides the plurality of image data signals sequentially,
  the controller provides a succession of values of the selection signal in a selected phase relationship with the plurality of sequential image data signals for each EL light-emitting diode in the EL device, and
  the multiplexer comprises a drive transistor connected to a first power supply and a plurality of current control circuits; each current control circuit connected to a gate electrode of the drive transistor, and comprising a write transistor, a storage element and a read transistor.

2. The drive circuit of claim 1, wherein the controller provides the succession of values of the selection signal to the multiplexer, each selection signal being provided for one display period.

3. The drive circuit of claim 1, wherein the image data signals are analog signals.

4. The drive circuit of claim 1, each current control circuit comprising a select line connected to a gate electrode of a corresponding write transistor, and a read out line connected to a gate electrode of a corresponding read transistor.

5. The drive circuit of claim 1, comprising at least two current control circuits, wherein the write transistor of a first current control circuit is a transistor of a first doping and a write transistor of a second current control circuit is a transistor of a second doping.

6. The drive circuit of claim 1, comprising at least two current control circuits, wherein a read transistor of a first current control circuit is a transistor of a first doping and a read transistor of a second current control circuit is a transistor of a second doping.

7. The drive circuit of claim 1, comprising a pair of output current control circuits and at least one input current control circuit, wherein the signal source provides an image data signal to the input current control circuit.

8. The drive circuit of claim 1, wherein the storage element is a capacitor.

9. The drive circuit of claim 1, wherein the control signal is a selected portion of a pulse-width modulated waveform.

10. The drive circuit of claim 1, wherein the selection signal includes a succession of signal values that impacts the interleaving of the image data.

11. The drive circuit of claim 1, wherein the signal source provides a plurality of input data signals having a first gray scale resolution and, in response to a mode signal, converts the input data signals to image data signals or divides the input data signals into image data signals of a second gray scale resolution wherein the second gray scale resolution is lower than the first gray scale resolution.

12. The drive circuit of claim 1, wherein the signal source provides a first image data signal and a second image data signal sequentially and wherein the controller provides a first selection signal in phase with the first image data signal and a second selection signal out of phase with the second image data signal.

13. An EL display system, comprising:
 a. an array of EL devices, each EL device emitting light in response to a control signal;
 b. an array of drive circuits for providing control signals, each drive circuit having a multiplexer for receiving a plurality of image data signals and, in response to a selection signal, selecting one of the plurality of image data signals to provide the control signal;
 c. a signal source for providing the plurality of image data signals, each image data signal being provided for a specified load period; and
 d. a controller for causing interleaving of the image data during multiple display periods, wherein each display period is shorter than the load period;
 wherein
  the signal source provides the plurality of image data signals sequentially,
  the controller provides a succession of values of the selection signal in a selected phase relationship with the plurality of sequential image data signals for each EL light-emitting diode in the EL device, and
  the multiplexer comprises a drive transistor connected to a first power supply and a plurality of current control circuits; each current control circuit connected to a gate electrode of the drive transistor, and comprising a write transistor, a storage element and a read transistor.

14. The EL display system claimed in claim 13, wherein the EL device further comprises an active optical layer for changing an optical property of the emitted light in synchronization with changes in the selection signal.

15. The EL display system claimed in claim 13, wherein the EL device is an organic light-emitting diode.

16. The EL display system claimed in claim 13, wherein the EL device is an inorganic light-emitting diode.

17. The EL display system claimed in claim 13, wherein the EL display is a stereoscopic or 3D display and the plurality of image data signals includes a left eye image data signal and a right eye image data signal.

18. The EL display system claimed in claim 13, wherein the signal source is a column driver and each drive circuit is an active matrix pixel circuit containing one or more storage elements.

* * * * *